March 16, 1926. 1,577,317
W. JARDH
BELT TIGHTENER WITH RAPID BELT TENSION RELEASE
Filed May 2, 1923 2 Sheets-Sheet 2
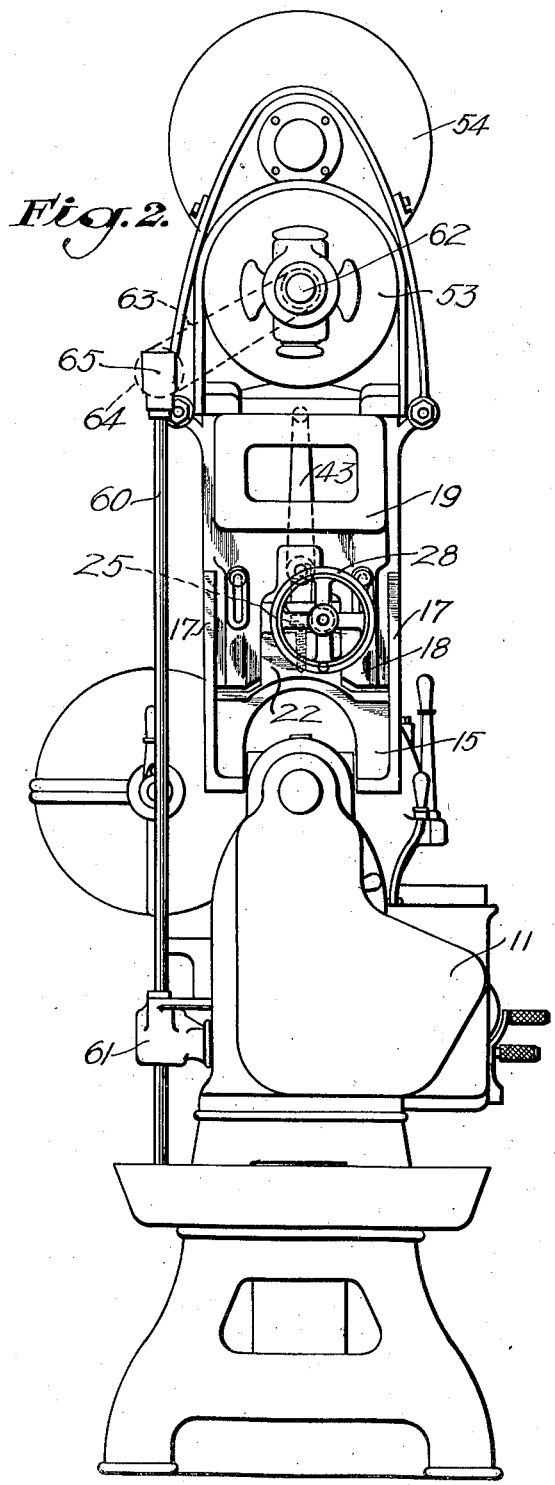
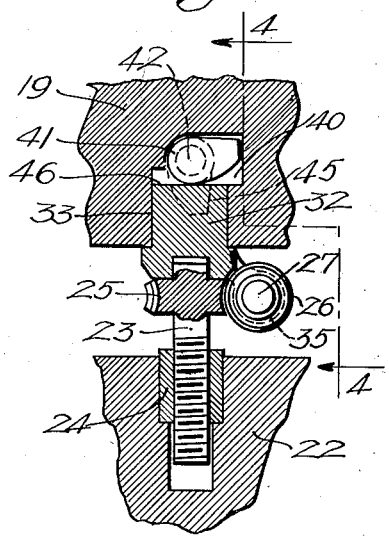
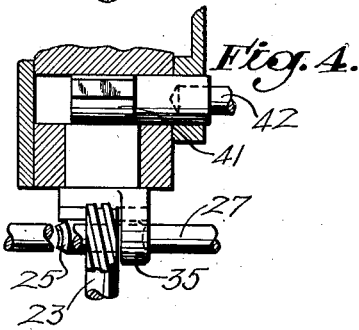
INVENTOR:
WILHELM JARDH,
By
Graham + Davis
ATTORNEYS.

Patented Mar. 16, 1926.

1,577,317

UNITED STATES PATENT OFFICE.

WILHELM JARDH, OF LOS ANGELES, CALIFORNIA, ASSIGNOR TO AXELSON MACHINE COMPANY, A CORPORATION OF CALIFORNIA.

BELT TIGHTENER WITH RAPID BELT TENSION RELEASE.

Application filed May 2, 1923. Serial No. 636,085.

*To all whom it may concern:*

Be it known that I, WILHELM JARDH, a citizen of the United States, residing at Los Angeles, in the county of Los Angeles and State of California, have invented a new and useful Belt Tightener with Rapid Belt Tension Release, of which the following is a specification.

This invention relates to belt drives employed for transmitting power from a drive pulley arrangement to the driven pulley of a machine.

The invention is of utility with various mechanical devices and is a particularly valuable drive arrangement for lathes and other related metal working machinery. In this presentation of my invention, I shall describe its use with a lathe. It will be evident, however, that the device is not limited to this use, but may be applied to a large number of other power driven devices.

The invention contemplates a means whereby the ultimate driving power may be derived from a belt and pulley driving arrangement. This is accomplished by the use of an arrangement for moving the driving pulley away from the driven pulley so that a tension is placed in the belt driven member. Means is provided for quickly adjusting the tension on the belt, and when it is desired to change the belt from one step of the pulley to another, a quick operating release provided with the invention may be employed to move the drive pulley a limited distance towards the driven pulley, thus allowing sufficient slack in the belt for the change to be made. This release attachment is also of particular value for the purpose of relieving the tension on the belt when the machine is not in use, in this manner greatly increasing the life of the belt. In ordinary belt drives for lathes considerable looseness must be left in order to allow for shifting the belt. It is recognized that the ultimate driving capacity of a belt is not realized unless the belt is operated in tension, in order to develop the highest frictional engagement between the pulley and the belt.

The especial advantages of the invention and further objects thereof will be made evident hereinafter.

Relating to the drawings, which are for illustrative purposes only:

Fig. 2 is an end elevation, viewing the arrangement shown in Fig. 1, as indicated by the arrow 2.

Fig. 3 is an enlarged fragmentary section taken upon the plane represented by the line 3—3 of Fig. 1.

Fig. 4 is a fragmentary section taken substantially as indicated by the line 4—4 of Fig. 3.

Figure 1:
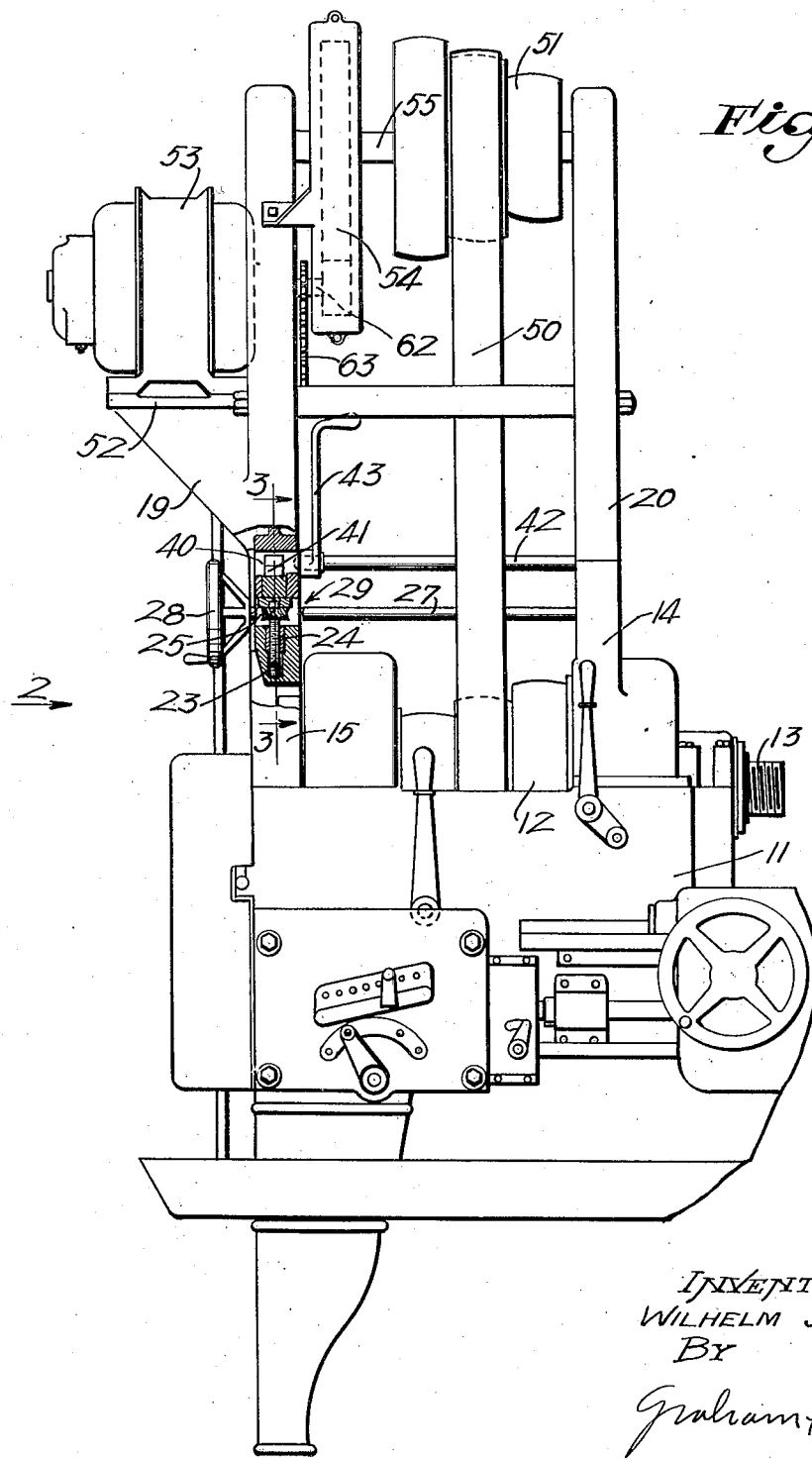
Fig. 1 is a front elevation of the head of a lathe equipped with a belt drive embodying the features of my invention.

In Figs. 1 and 2 of the drawings, 11 indicates the head of a lathe equipped in the customary manner with a cone pulley 12 which drives the lathe spindle 13. Upon the head of the lathe, a pair of supporting members 14 and 15 are secured, these members being of suitable contour to fit upon the lathe castings and secured thereto by suitable bolts, not shown. As shown particularly in Fig. 2, each of the supporting members 14 and 15 is provided with upwardly extending parallel forks 17, which constitute slides in which the lower ends 18 of superstructure members 19 and 20 operate. The lower ends 18 of these members are in the form of legs which extend between the forks 17 and over centrally disposed blocks 22 projecting upwardly from the supporting members 14 and 15. In each of the blocks 22 an adjustment screw 23 is placed, which threads through an inserted sleeve 24, as shown in Figs. 1 and 3.

Integrally formed, near the upper end of each screw, is a worm wheel 25 which is engaged by a worm screw 26 rigidly secured upon a horizontal shaft 27, providing means whereby the screw 23 may be rotated by the operation of a hand wheel 28 mounted upon the outer end of the shaft 27, as shown in Fig. 1. In this figure a portion of the shaft 27 is broken away at 29 so as to disclose the manner in which blocks 32, which are inserted in openings 33 in the superstructure members 19 and 20, rest upon the upper ends of the adjustment screw 23. These blocks 32, as shown in Figs. 3 and 4, are provided with projecting arms 35 which support the shaft 27 in alignment with the worm wheels 25, thus keeping the worms 26 in proper engagement therewith. It will be seen that by rotating the shaft 27 the worm wheels 25 situated in the members 14 and 15 will be driven by the worm screws 26, and the adjustment screws 23 either raised or lowered through the sleeves 24. The superstructure members 19 and 20 rest upon the blocks 32, which in turn are situated upon the adjustment screws 23, making it possible to raise or lower the superstructure by operating the hand wheel 28 in a manner to advance or retract the adjustment screws 23.

In recesses 40, formed above the blocks 32, lifting cams 41 are situated. These cams 41 are connected together by a horizontal shaft 42 having an operating lever 43 associated therewith whereby the cams may be thrown into erect position, as indicated by the dotted lines 45 in Fig. 3. In being turned in this manner, the cams 41 bear against the top faces 46 of the blocks 33 with the result that the superstructure members 19 and 20 are moved upwardly a distance equaling the throw of the cams 41. By the use of the lever 43 the superstructure may be quickly moved through a predetermined distance, this movement being provided for the purpose of tightening or loosening the belt 50 which drives the cone pulley 12 of the lathe from the drive cone pulley 51 mounted in the superstructure, in alignment with the pulley 12.

The superstructure which as hereinbefore described is comprised of the members 19 and 20, may be provided with a platform 52 for mounting a motor 53 which may be employed to drive pulley 51 through a reducing gear box 54. In this manner an individual drive arrangement is provided for each separate machine, but where line shafting is used it may be advisable to drive the jack shaft 55 by belt from the line shafting. In the arrangement shown, a vertical shaft 60, which extends through a lubricating pump 61 may be driven from the motor shaft 62 by a chain 63 which drives a sprocket 64, geared as indicated at 65 to the upper end of the shaft 60. When the superstructure is raised or lowered the shaft 60 slides through the pump 61.

The device herein described provides a means for mounting a drive pulley in movable relationship with a driven pulley in such a manner that the spacing of the pulleys may be varied to suit the length of the belt employed. The adjustment means for moving the drive pulley is very simple in operation and may be quickly operated to give the desired belt tension. A particular feature of the invention resides in the cam arrangement which provides a quick throw for moving the superstructure which carries the drive pulleys, through a short distance, thereby making it possible to drop the drive pulley down a short distance, with the result that the tension on the belt is released, this release in tension making it possible to easily shift the belt over the various steps of the cone pulleys. A further advantage of the tension release is that during the periods of inoperation the tension may be removed from the belt with the result that the life thereof is considerably increased. With the invention it is possible to operate the belt in tension and to therefore attain a positive yet flexible drive of the lathe spindle, the advantage of which will be readily recognized.

I claim as my invention:

1. In a machine tool, the combination of a stationary head; a driven shaft turning in bearings fixed in said head; a driven pulley on said driven shaft; a jack shaft above and parallel to said driven shaft; a driving pulley on said jack shaft; a belt passing over said driving pulley and said driven pulley; a superstructure having fixed bearings in which said jack shaft turns; means for driving the jack shaft; means for supporting said superstructure on said head so that said superstructure can be moved vertically with relation to said head in a single operation; blocks upon which said superstructure is supported; and means for adjusting said blocks vertically with relation to said head in a single operation.

2. In a machine tool, the combination of a stationary head; a driven shaft turning in bearings fixed in said head; a driven pulley on said driven shaft; a jack shaft above and parallel to said driven shaft; a driving pulley on said jack shaft; a belt passing over said driving pulley and said driven pulley; a superstructure having fixed bearings in which said jack shaft turns; means for driving the jack shaft; means for supporting said superstructure on said head so that said superstructure can be moved vertically with relation to said head; blocks upon which said superstructure is supported; means by which said superstructure may be adjusted vertically with relation to said blocks in a single operation; and means for adjusting said blocks vertically with relation to said head in a single operation.

3. In a machine tool, the combination of a stationary head; a driven shaft turning in bearings fixed in said head; a driven pulley on said driven shaft; a jack shaft above and parallel to said driven shaft; a driving pulley on said jack shaft; a belt passing over said driving pulley and said driven pulley; a superstructure having fixed bearings in which said jack shaft turns; a motor carried by said superstructure; means by which the motor drives the jack shaft; means for supporting said superstructure on said head so that said superstructure can be moved vertically with relation to said head; blocks upon which said superstructure is supported; means by which said superstructure may be adjusted vertically with relation to said blocks in a single operation; and means for adjusting said blocks vertically with relation to said head in a single operation.

In testimony whereof, I have hereunto set my hand at Los Angeles, California, this 26th day of April, 1923.

WILHELM JARDH.